United States Patent
Ono et al.

[11] Patent Number: 5,961,748
[45] Date of Patent: *Oct. 5, 1999

[54] LASER-WELDED STEEL PIPE

[75] Inventors: Moriaki Ono; Tsuyoshi Shiozaki; Masanori Ohmura; Yutaka Nagahama; Akio Sato; Kenichi Iwazaki; Yukio Sekine, all of Tokyo, Japan

[73] Assignee: NKK Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/684,401

[22] Filed: Jul. 19, 1996

[30] Foreign Application Priority Data

| Aug. 9, 1995 | [JP] | Japan | 7-203327 |
| Dec. 19, 1995 | [JP] | Japan | 7-330229 |

[51] Int. Cl.$^6$ ..................................... C22C 38/18
[52] U.S. Cl. .................. 148/333; 148/909; 219/121.63
[58] Field of Search ............... 219/121.63, 121.64; 148/525, 333, 909; 420/104, 120

[56] References Cited

U.S. PATENT DOCUMENTS

| 4,649,256 | 3/1987 | Minamida et al. . |
| 4,827,099 | 5/1989 | Krebs et al. . |
| 5,019,189 | 5/1991 | Kumura et al. ............... 219/60 R |
| 5,140,123 | 8/1992 | Mitani ........................ 219/61.2 |
| 5,213,633 | 5/1993 | Hada et al. .................. 148/333 |
| 5,286,309 | 2/1994 | Maeda et al. ................ 148/909 |
| 5,319,179 | 6/1994 | Joecks et al. ............. 219/76.15 |
| 5,653,899 | 8/1997 | Odake et al. ............. 219/121.64 |

FOREIGN PATENT DOCUMENTS

| 628377 | 12/1994 | European Pat. Off. ........ 219/121.64 |
| 56-168981 | 12/1981 | Japan . |
| 60-46890 | 3/1985 | Japan ......................... 219/121.64 |
| 61-159534 | 7/1986 | Japan . |
| 62-84888 | 4/1987 | Japan ......................... 219/121.64 |
| 62-134181 | 6/1987 | Japan ......................... 219/121.64 |
| 63-126683 | 5/1988 | Japan ......................... 219/121.64 |
| 5-192781 | 8/1993 | Japan ......................... 219/121.64 |

Primary Examiner—Geoffrey S. Evans
Attorney, Agent, or Firm—Frishauf, Holtz, Goodman, Langer & Chick, P.C.

[57] ABSTRACT

A laser-welded steel pipe includes: a steel pipe consisting essentially of C in an amount of 0.01 to 0.5 wt. %, Si in an amount of 1 wt. % or less, Mn in an amount of 0.05 to 2 wt. % and Cr in an amount of 6 wt. % or less; and a weld zone having a melted and solidified metal structure containing carbon and oxygen. The carbon content, [C wt. %], and the oxygen content, [O wt. %], in the melted and solidified metal structure satisfies the following equations:

[C wt. %]×[O wt. %]≦0.006, for the steel pipe containing C in an amount of less than 0.2 wt. %,

[O wt. %]≦0.03, for the steel pipe containing C in an amount of 0.2 wt. % or more.

13 Claims, 4 Drawing Sheets

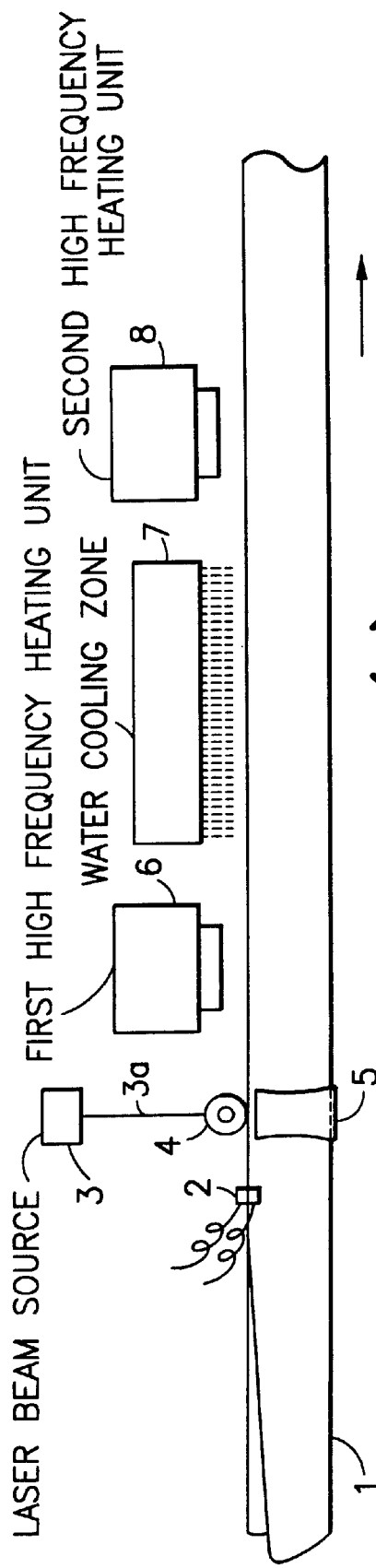
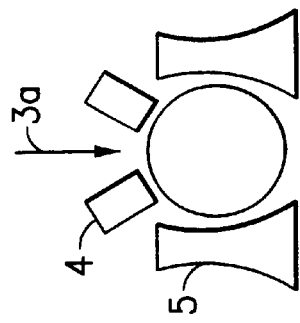
FIG.1(A)
FIG.1(B)

LASER-WELDED STEEL PIPE

BACKGROUND OF THE INVENTION

1. Field of the Invention

The present invention relates to a laser-welded steel pipe and a method therefor.

2. Description of the Related Arts

In a conventional method for manufacturing a steel pipe, a steel strip is continuously formed to prepare an open pipe having edge parts, and edge parts facing each other is heated and welded. The steel pipes manufactured by the conventional method are commonly called electroseamed steel pipes, which are widely used in machine structures, pipes in various kinds of plants, line pipes, and parts.

That type of electroseamed steel pipes include general carbon steel pipe, low alloy steel pipe, and stainless steel pipe. Most of the electroseamed steel pipes are, however, occupied by the general carbon steel pipe and the low alloy steel pipe.

Heating of the welding part in the manufacturing method is conducted by high frequency heating or resistance heating. These heating methods have and advantage of high productivity compared with other methods for manufacturing welded steel pipes.

Neverless, the electroseam method inherently likely induces fine defects at the welded part, so the method is understood as not applicable for a product required to have high reliability. For instance, electroseamed steel pipes using a stainless steel which contains a large amount of alloying elements are limited in their production and application.

The largest cause of such a limitation is that the electroseam method brings the welding part to an intermediate state between common fusion-welding and pressure-welding, and that the welding part does not form a clear molten pool therein so that the inclusions such as oxides formed during welding process are difficult to be discharged from inside of the steel structure.

To cope with the disadvantage of electroseam method, various technologies have been introduced. Among them, a method for improving the disadvantage caused by incomplete fusion of the above-described welding part was disclosed in unexamined Japanese patent publication No. 56-168981. According to the disclosure, the edge parts facing each other on an open pipe are pre-heated by high frequency heating followed by melting the junction point of edge parts with laser beam at near the squeeze roll to conduct pressure-welding.

In that manner, a combination of conventional electroseam method with laser heating method ensures the edge parts to finally fuse to weld together. Accordingly, the defects caused by inclusions which are a problem of electroseam method are expected to significantly reduce. In addition, pre-heating suppresses incomplete penetration which often occurs in a high speed laser-welding.

The above-described technology disclosed in unexamined Japanese patent publication No. 56-168981 may be said to be a basic technology for manufacturing steel pipes at a high speed without generating defects. For applying the technology to a commercial production line, however, there are many issues to be solved. The largest issue of them is to determine the quantity of irradiating energy to satisfy the welding.

Laser-welding has also a colliding relation between the increase in welding speed (increase of productivity) and the defect rate. That is, increase of irradiating energy quantity or decrease of pipe manufacturing speed increases the probability of removal of generated inclusions from the molten steel pool, thus providing a welded part having less inclusions. However, the condition decreases the productivity.

There is a similar relation on the tendency of gas blow holes. That is, bubbles formed during melting process float up through the molten pool as observed in the behavior of inclusions, and finally the bubbles go out from the pool. If the laser irradiation energy is strong, the cooling speed of the steel becomes slow, and sufficient time is expected to ensure until considerable amount of bubbles float up to the surface of pool. To the contrary, if the laser irradiation energy quantity is less, the molten pool rapidly solidifies, thus the steel solidifies before sufficient number of gas bubbles escape from the steel, and finally a welded part containing lots of blow holes appears.

The laser irradiation heating is a method to concentrate energy onto a narrow range. Accordingly, in a steel pipe manufacturing process, a high temperature molten pool and a steel at near normal temperature are located closely to each other. As a result, the molten pool which was formed by the laser irradiation is rapidly cooled by transferring the heat to the surrounding low temperature steel. Consequently, even when the laser irradiation increases the heat input, the above-described defects likely remain. In addition, strain at near the welded part is large, and the residual stress is also large. Furthermore, the laser-welding does not necessarily transfer a large quantity of energy compared with the consumed electric power, and a laser generator with large output is expensive.

The technology disclosed in unexamined Japanese patent publication No. 56-168981 which is described above adopts pre-heating before laser irradiation to solve the above-described problems of laser-welding, or the problems of energy cost and of rapid cooling. The pre-heating by high frequency heating has a function to heat a broad area at near the edge parts of open pipe compared with laser irradiation. The heating method provides high heating efficiency per input energy.

Welded pipes are requested to assure the defectless condition and to be produced in good efficiency and at a low cost. That is, the optimum pre-heating condition and the optimum laser heating condition should be established while assuring the characteristics of the steel pipe and satisfying the economy. Accordingly, if the optimization of economy (productivity) comes first, and thus increasing the input of heat by pre-heating and minimizing the input of heat by laser irradiation to let the melted part exist simply by the laser irradiation, then no satisfactory steel pipe is obtained.

For example, when the above-described pre-heating is conducted in air, oxides deposit on the surface of the steel, and oxides also deposit on the edge parts facing each other on the open pipe. The edge parts melt under the laser irradiation, and the oxygen concentration in the steel increases. The hot-rolled steel strip which forms the open pipe is prepared by a steel that was fully deoxidized. During the welding operation, passage of laser beam at near the welding part is shielded by argon or other inert gas, so the amount of atmospheric components (particularly oxygen) which are brought into the molten steel pool during the welding process is not so large.

Chemical reactions occurred in the molten pool which was formed by laser irradiation is discussed below.

As described before, oxide film generated during the pre-heating in air exists on the steel surface. When the steel fuses, carbon in the steel and oxygen in the oxide film react to yield CO and $CO_2$ gases to induce bubbling. The bubbling then induces the reactions for generating spatters and gas bubbles, which results in blow hole defects. Diminishing carbon from steel results in the reduction of steel strength, which is also a problem.

To prevent the reactions yielding CO and $CO_2$ gases, either one of O or C should be prevented from entering the molten pool. Even when the amount of O in the molten pool is large, less amount of C makes the reaction for yielding CO and $CO_2$ gases difficult to proceed.

Carbon is, however, a most common element to ensure the strength of steel. Therefore, simple reduction of the amount of C is not acceptable, and the above-described measures are not applicable. As a result, reduction of oxygen content becomes an alternative measures. There is, however, no established method to reduce the amount of oxygen on commercial basis. Thus, the present state is that, even for a welded steel pipe produced by minimizing inclusions by laser irradiation, the presence of blow hole defects is accepted as unavoidable.

SUMMARY OF THE INVENTION

It is an object of the present invention to provide a welded steel pipe having a weld zone with less defects and a method therefor.

To attain the object, the present invention provides a laser-welded steel pipe having a weld zone comprising:

a steel pipe consisting essentially of C in an amount of 0.01 to 0.5 wt. %, Si in an amount of 1 wt. % or less, Mn in an amount of 0.05 to 2 wt. % and Cr in an amount of 6 wt. % or less;

said weld zone having a melted and solidified metal structure; and said melted and solidified metal structure containing carbon and oxygen, the carbon content, [C wt. %], and the oxygen content, [O wt. %], in the melted and solidified metal structure satisfying the following equations:

[C wt. %]×[O wt. %]≦0.006, for the steel pipe containing C in an amount of less than 0.2 wt. %,

[O wt. %]≦0.03, for the steel pipe containing C in an amount of 0.2 wt. % or more.

Preferably, the carbon content, [C wt. %], and the oxygen content, [O wt. %], in the melted and solidified metal structure satisfies the following equations:

[C wt. %]×[O wt. %]≦0.004, for the steel pipe containing C in an amount of less than 0.2 wt. %,

[O wt. %]≦0.02, for the steel pipe containing C in an amount of 0.2 wt. % or more.

Furthermore, the present invention provides a method for manufacturing a laser-welded steel pipe comprising the steps of:

(a) producing an open pipe with two edge parts facing each other from a hot-rolled steel strip using a forming roll;

(b) preheating the two edge parts of the open pipe;

(c) pressing the open pipe by squeeze rolls to butt the two edge parts each other;

(d) welding the butted two edge parts by irradiating a laser beam to heat and melt the two edge parts, a melted and solidified metal structure containing carbon and oxygen being formed during the welding; and (e) controlling conditions of step (d) so that the carbon content, [C wt. %], and the oxygen content, [O wt. %], in the melted and solidified metal structure satisfies the following equations:

[C wt. %]×[O wt. %]≦0.006, for the steel pipe containing C in an amount of less than 0.2 wt. %,

[O wt. %]≦0.03, for the steel pipe containing C in an amount of 0.2 wt. % or more.

Preferably, the carbon content, [C wt. %], and the oxygen content, [O wt. %], in the melted and solidified metal structure satisfies the following equations:

[C wt. %]×[O wt. %]≦0.004, for the steel pipe containing C in an amount of less than 0.2 wt. %,

[O wt. %]≦0.02, for the steel pipe containing C in an amount of 0.2 wt. % or more.

It is preferable that the hot-rolled steel strip consists essentially of C in an amount of 0.01 to 0.5 wt. %, Si in an amount of 1 wt. % or less, Mn in an amount of 0.05 to 2 wt. % and Cr in an amount of 6 wt. % or less.

BRIEF DESCRIPTION OF THE DRAWINGS

FIG. 1(A) is a schematic drawing of a pipe-manufacturing apparatus which is used to perform the present invention.

FIG. 1(B) is a schematic drawing of a squeeze roll part of the pipe-manufacturing apparatus.

DESCRIPTION OF THE EMBODIMENT

Embodiment 1

Figure 2:
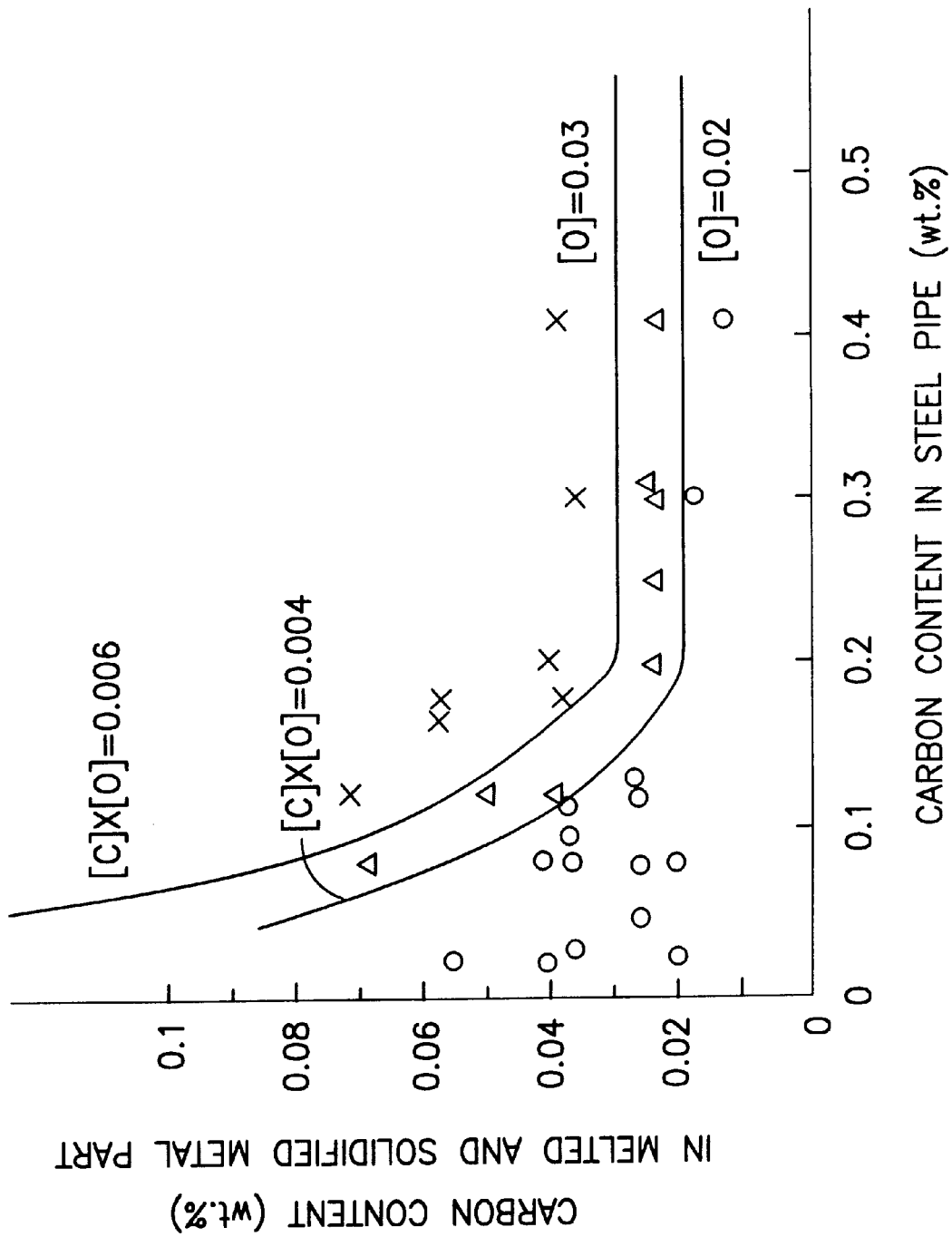
FIG. 2 is a graphical representation showing the relationship between C content and O content in the melted and solidified metal part, and defect rate in weld zone according to the embodiment 1.

The present invention was derived from the inventors' finding that, on a welded steel pipe using a welded part having a melted and solidified structure formed by laser irradiation onto the welding part, the residual blow hole defects in the melted and solidified structure are caused from CO and $CO_2$ gases which were generated by reactions between C in the steel and the steel oxide which was formed during pre-heating stage. Based on the finding, the inventors determined the optimum condition for pre-heating responding to the composition of steel being treated white taking into account of economy.

To prevent the CO and $CO_2$ gas forming reactions, either one of C or O should be prevented from entering into the molten pool. For removing O from the system, pre-heating may be conducted in a state of almost completely isolating the atmospheric air. The means is applicable in terms of technology. That is, if the economy is not taken into account, an open pipe can be produced in a vacuum, and laser-welding may be applied in the vacuum. This method needs, however, significantly high investment cost and operation cost. More realistically, for example, nitrogen gas may be introduced to the peripheral zone of welding part during the pre-heating stage. The method is an effective one, though the cost considerably increases.

An alternative method is the one in which pre-heating and laser welding are performed while admitting oxidation by atmospheric air during the pre-heating stage, which is a different concept from the concepts given before. Higher heating temperature and longer heating period enhance oxidization and produce an increased amount of oxides, and increase the amount of oxygen brought into the molten pool.

In that case, when a steel containing a very small amount of carbon is used for welding by that type of pre-heating and laser welding method, CO and $CO_2$ gases are hardly generated even if oxygen entered the molten pool. Accordingly, the condition of pre-heating becomes broad. On the other hand, when a steel containing a large amount of carbon is used for producing welded steel pipes in a similar procedure with that given above, CO and $CO_2$ gases are likely generated so that the pre-heating temperature and period are necessary to select to significantly low and short, respectively.

The inventors adopted the pre-heating and laser-welding method assuming oxidation by atmospheric air during the pre-heating stage, and performed extensive study to determine a condition of pre-heating responding to the carbon content, which carbon is the most important alloying element in iron and steel materials and which content is determined by specific use and application of the steel. Thus, the inventors completed the present invention.

The first aspect of embodiment 1 is to provide a welded steel pipe made of a steel containing: 0.01 to 0.5 wt. % C, 1 wt. % or less Si, 0.05 to 2 wt. % Mn. and 6 wt. % or less Cr; the steel pipe having a weld zone containing a melted and solidified structure; the melted and solidified structure containing C and O, on wt. % basis, satisfying a relation of [C wt. %]×[O wt. %]≦0.006 for a steel containing less than 0.2 wt. % C, and [O wt. %]≦0.03 for a steel containing 0.2 wt. % or more C.

The second aspect of embodiment 1 is to provide a welded steel pipe made of a steel containing: 0.01 to 0.5 wt. % C, 1 wt. % or less Si, 0.05 to 2 wt. % Mn, and 6 wt. % or less Cr; the steel pipe having a weld zone containing a melted and solidified structure; the melted and solidified structure containing C and O, on wt. % basis, satisfying a relation of [C wt. %]×[O wt. %]≦0.004 for a steel containing less than 0.2 wt. % C, and [O wt. %]≦0.02 for a steel containing 0.2 wt. % or more C.

The third aspect of embodiment 1 is to provide a method for manufacturing welded steel pipe comprising the steps of:

pre-heating edge parts facing each other on an open-pipe, which open-pipe contains 0.01 to 0.5 wt. % C, 1 wt. % or less Si, 0.05 to 2 wt. % Mn, and 6 wt. % or less Cr;

heating the edge parts to melt thereof by irradiating laser beam at near a squeeze roll to join the edge parts of the open-pipe together to form a welded steel pipe; wherein the melting and solidifing process of the melt and solidified metal part of the steel pipe is conducted under a condition that C and O content therein, on wt. % basis, satisfies a relation of [C wt. %]×[O wt. %]≦0.006 for a steel containing less than 0.2 wt. % C, and [O wt. %]≦0.03 for a steel containing 0.2 wt. % or more C.

The fourth aspect of the present invention is to provide method for manufacturing welded steel pipe comprising the steps of:

pre-heating edge parts facing each other on an open-pipe, which open-pipe contains 0.01 to 0.5 wt. % C, 1 wt. % or less Si, 0.05 to 2 wt. % Mn, and 6 wt. % or less Cr;

heating the edge parts to melt thereof by irradiating laser beam at near a squeeze roll to join the edge parts of the open-pipes together to form a welded steel pipe; wherein the melting and solidifing process of the melted and solidified metal part of the steel pipe is conducted under a condition that C and O content therein, on wt. % basis, satisfies a relation of [C wt. %]×[O wt. %]≦0.004 for a steel containing less than 0.2 wt. % C, and [O wt. %]≦0.02 for a steel containing 0.2 wt. % or more C.

FIG. 1 is a schematic drawing of pipe-production facility to manufacture the welded steel pipes of the embodiment 1. FIG. 1(A) shows the total view of the apparatus, and FIG. 1(B) shows the squeeze roll part of the apparatus. The apparatus is structured by adding a laser irradiation unit to a conventional electroseam steel pipe manufacturing apparatus. According to the apparatus for manufacturing the welded steel pipe of the embodiment 1, a set of multi-stage rolls which are not shown forms a pipe body 1 of steel having the composition described before and having an open pipe shape. Electric power enters from the contact tip 2 into the steel to heat the open edge parts to pre-heat the butt joined part to an adequate temperature. The heating may be conducted by a high frequency induction heating method. Then, laser beam source 3a emits laser beam 3a against the butt joined part of the pipe body 1 while the top roll 4 press-holding the upper edge of the pipe body 1 to give upset for welding the butt joined part using the side roll 5 as the squeeze roll, to obtain a welded steel pipe. As the succeeding steps, the first high frequency heating unit 6, the water-cooling zone 7, the second high frequency heating unit 8 are applied to perform post-heat treatment such as normalizing, hardening, and tempering responding to the use object of the steel pipe.

The following is the description on the components of steel used for the welded steel pipe of the present invention.

The C content in the steel used for the welded steel pipe of the embodiment 1 is in a range of from 0.01 to 0.5 wt. %. A steel containing C at more than 0.5 wt. % is applicable for laser welding, but that type of steel is inferior in hot-workability, weldability, ductility, and toughness, so the steel is practically difficult for manufacturing welded steel pipe. Accordingly, the upper limit of C content is selected to 0.5 wt. %. On the other hand, a steel containing C at less than 0.01 wt. % is difficult to ensure strength, and that type of steel generates less CO and $CO_2$ gases inherently, as described before, so that the steel does not need to apply the present invention. As a result, the lower limit of C content is selected to 0.01 wt. %.

Silicon is added to a range of 1 wt. % or less. Although Si is a deoxidizing element, when Si is added to above 1 wt. %, the amount of oxides increases during welding operation, and toughness decreases.

Manganese is a desulfurizing element and has a strengthening effect, so Mn is added to 0.05 wt. % or more. For assuring weldability and toughness, the upper limit of Mn content is selected to 2 wt. %.

Chromium is an effective element for assuring corrosion resistance, and it also has a strengthening effect. If, however, Cr content exceeds 6 wt. %, then weldability and toughness are difficult to secure, and excessive amount of oxides appear on the weld zone. Therefore, the Cr content is selected to 6 wt. % or less.

For other elements, addition of them is allowable and inclusion of them as inevitable impurities is allowable as far as they do not affect the spirit of the present invention.

The allowable range of other elements are the following.
Al: 0.1 wt. % or less, N: 0.01 wt. % or less,
Ti: 0.1 wt. % or less, Zr: 0.1 wt. % or less,
Nb: 0.5 wt. % or less, V: 0.5 wt. % or less,
Ni: 2 wt. % or less, Cu: 2 wt. % or less,
Mo: 2 wt. % or less, W: 2 wt. % or less,
B: 0.005 wt. % or less,
Ca: 0.01 wt. % or less, Mg: 0.01 wt. % or less,
REM (rare earth metals): 0.1 wt. % or less,
P: 0.04 wt. % or less, S: 0.03 wt. % or less.

The amount of oxygen enters the molten pool is proportional to the surface area of the part heated during the pre-heating period. The amount of oxygen is affected by pre-heating temperature, time, and atmosphere. That is, higher temperature, longer period, and larger oxygen amount in atmosphere of pre-heating increase the amount of oxides formed on the surface of steel during the pre-heating period, thus increasing the amount of oxygen in the molten pool.

The amount of oxygen in the molten pool is expressed by eq.(1), for example.

Amount of oxygen in molten pool (wt. %)=$2 \times 10^{-9} \times t \times T^{1.5} \times A^{0.5}$ (1)

where, t (sec) is the time from the point reaching the temperature of (pre-heating temperature—20° C.) to the point of completion of laser irradiation, T (°C.) is the temperature [pre-heating temperature—400° C.], and A (%) is the amount of oxygen in atmosphere.

In eq.(1), the components and composition of steel, and the thickness of steel strip for producing the steel pipe, within a range given above, are negligible because they give no significant effect to the amount of oxygen. Eq.(1) may be modified depending on the facility used and the operating condition. The significance of eq.(1) is that the amount of oxygen in the molten pool is a function of the temperature and period of pre-heating stage and the atmosphere thereof. Table 1 shows examples of experimental result on the relation between pre-heating condition and amount of oxygen in steel. As seen in the table, an elevated pre-heating temperature increases the amount of oxygen in the molten pool, and a decreased oxygen concentration in atmosphere decreases the amount of oxygen in the molten pool.

An important point is that O which causes defects is fixed as an oxide on the steel surface or at near thereof conforming to the relation described above by the reaction between the steel and the atmosphere during the pre-heating operation. The fundamental technological concept of the present invention is that the limitation of O responding to the amount of C at the weld-solidification part can suppress the amount of formed oxides to below the critical value.

A series of experiments were conducted on the basis of the above-described concept, and the inventors found that the generation of defects significantly decreases when the following relation is established:

[C wt. %]×[O wt. %]≦0.006 for a steel containing less than 0.2 wt. % C, and

[O wt. %]≦0.03 for a steel containing 0.2 wt. % or more C.

The inventors found that the generation of defects further decreases when the following relation is established:

[C wt. %]×[O wt. %]≦0.004 for a steel containing less than 0.2 wt. % C, and

[O wt. %]≦0.02 for a steel containing 0.2 wt. % or more C.

The defects herein expressed represent a concept containing all the defects including inclusions and voids.

TABLE 1

| Pre-heating temperature (° C.) | $T^{1.5}$ | Heating time; t (sec) | Oxygen concentration; A (%) | $A^{0.5}$ | Amount of oxygen in molton pool (%) |
| --- | --- | --- | --- | --- | --- |
| 450 | 350 | 20 | 20 | 4.5 | 0.01 |
| 500 | 1000 | 20 | 20 | 4.5 | 0.02 |
| 600 | 2800 | 20 | 20 | 4.5 | 0.05 |
| 700 | 5200 | 20 | 20 | 4.5 | 0.09 |
| 800 | 8000 | 20 | 20 | 4.5 | 0.14 |
| 700 | 5200 | 20 | 5 | 2.2 | 0.05 |
| 800 | 8000 | 20 | 5 | 2.2 | 0.07 |

TABLE 1-continued

| Pre-heating temperature (° C.) | $T^{1.5}$ | Heating time; t (sec) | Oxygen concentration; A (%) | $A^{0.5}$ | Amount of oxygen in molton pool (%) |
| --- | --- | --- | --- | --- | --- |
| 700 | 5200 | 20 | 1 | 1 | 0.02 |
| 800 | 8000 | 20 | 1 | 1 | 0.03 |

Amount of oxygen in molton pool (%) = $2 \times 10^{-9} \times t \times T^2 \times A^{0.5}$
T = (Pre-heating temperature - 400) ° C.

EXAMPLE

Steels shown in Table 2 were prepared by converter-melting and degassing processing, and they were subjected to continuous casting, slab heating, and hot-rolling to obtain hot-rolled steel strips. All the steels shown in Table 2 have composition within a range of the present invention.

Each of these steel strips was continuously formed into an open pipe. Both edge parts of the open pipe were pre-heated to a specified temperature level using an electric heating method, followed by melting the edge parts by laser irradiation to upset them to obtain the welded pipe. The holding time at the pre-heating temperature was selected to about 10 sec. The time between the temperature increase from (pre-heating temperature—20° C.) and the pre-heating temperature was also selected to about 10 sec. The apparatus applied in the examples is similar to that given in FIG. 1.

The welding condition was 10 m/min. of welding seed, 800 kW of input power through the contact tip, and the upset was varied in a range of from 0 to 5 mm. The laser output was 10 kW, the beam diameter at the focusing point was 0.5 mm, and the irradiation was conducted from above the open edge pipe while focusing on the butting point of the edges.

On the other hand, steels shown in Table 3 are the comparative examples which are outside of the range of the present invention. Among these comparative steels, No. 17 and No. 20 were unable to roll. Steel strips having other steel composition were processed by similar method as in the above-described examples to form welded steel pipes.

All the produced steel pipes had a size of 609.6 mm of outer diameter and 11.1 mm of thickness.

After the pipe was produced, a sample was cut to conduct microscopic observation at the welded part. The observation section was selected to a plane lateral to the weld line (longitudinal direction of pipe). FIG. 2 and Table 4 show the result of observation. The voids and inclusions were counted while they were not separately treated. In FIG. 2, the mark (x) corresponds to the defect rate exceeding 2%, the mark (Δ) corresponds to the defect rate ranging from more than 1% and not more than 2%, and the mark (○) corresponds to the defect rate not higher than 1%. When the sum of voids and inclusions is not higher than 2%, the steel is in an allowable range.

As shown in FIG. 2, when the following condition is established, the sum of voids and inclusions was 2% or less.

[C wt. %]×[O wt. %]≦0.006 for a steel containing less than 0.2 wt. % C, and

[O wt. %]≦0.03 for a steel containing 0.2 wt. % or more C.

When the following condition is established, the sum of voids and inclusions was 1% or less.

[C wt. %]×[O wt. %]≦0.004 for a steel containing less than 0.2 wt. % C, and

[O wt. %]≦0.02 for a steel containing 0.2 wt. % or more C.

When the following condition is established, the sum of voids and inclusions was more than 2%.

[C wt. %]×[O wt. %]>0.006 for a steel containing less than 0.2 wt. % C, and

[O wt. %]>0.03 for a steel containing 0.2 wt. % or more C.

As described above, the present invention provides a welded steel pipe having less defects in the melted and solidified metal structure without degrading economy by suppressing the formation of oxides through the limitation of O content responding to the C content at the melted and solidified part, and provides a method for manufacturing the welded steel pipe.

TABLE 2

| Steel No. | Composition (wt %) | | | | | | | | | | | | | | |
|---|---|---|---|---|---|---|---|---|---|---|---|---|---|---|---|
| | C | Si | Mn | P | S | Ni | Cr | Mo | Cu | Ti | Nb | V | B | Al | N |
| 1 | 0.05 | 0.22 | 1.15 | 0.012 | 0.002 | 0.00 | — | — | — | — | — | — | — | 0.005 | — |
| 2 | 0.08 | 0.24 | 1.15 | 0.012 | 0.002 | 0.00 | — | — | — | — | — | — | — | 0.005 | 0.003 |
| 3 | 0.12 | 0.23 | 1.22 | 0.013 | 0.002 | 0.00 | — | — | — | — | — | — | — | 0.005 | 0.002 |
| 4 | 0.20 | 0.25 | 1.16 | 0.012 | 0.002 | 0.00 | — | — | — | — | — | — | — | 0.005 | 0.003 |
| 5 | 0.25 | 0.25 | 1.22 | 0.014 | 0.002 | 0.00 | — | — | — | — | — | — | — | 0.008 | 0.002 |
| 6 | 0.41 | 0.22 | 1.15 | 0.012 | 0.002 | 0.00 | — | — | — | — | — | — | — | 0.005 | 0.003 |
| 7 | 0.30 | 0.12 | 1.15 | 0.012 | 0.002 | 0.00 | — | — | — | — | — | — | — | 0.005 | 0.002 |
| 8 | 0.31 | 0.42 | 1.15 | 0.012 | 0.002 | 0.00 | — | — | — | — | — | — | — | 0.006 | 0.003 |
| 9 | 0.31 | 0.22 | 1.15 | 0.012 | 0.002 | 0.01 | — | — | — | — | — | — | — | 0.014 | 0.002 |
| 10 | 0.31 | 0.22 | 1.15 | 0.012 | 0.002 | 0.02 | — | — | — | — | — | — | — | 0.023 | 0.004 |
| 11 | 0.02 | 0.25 | 1.14 | 0.013 | 0.002 | 0.61 | 0.12 | 0.01 | 0.57 | 0.04 | 0.02 | 0.14 | 0.004 | 0.074 | 0.006 |
| 12 | 0.08 | 0.21 | 0.87 | 0.012 | 0.002 | 0.02 | 2.24 | 1.02 | 0.04 | 0.03 | 0.44 | 0.41 | 0.001 | 0.013 | 0.006 |
| 13 | 0.03 | 0.22 | 1.13 | 0.034 | 0.022 | 0.01 | 0.02 | 0.01 | 0.02 | 0.14 | 0.02 | 0.14 | 0.002 | 0.014 | 0.005 |
| 14*[1] | 0.08 | 0.21 | 1.13 | 0.013 | 0.002 | 0.02 | 0.004 | 0.02 | 0.004 | 0.01 | — | — | — | 0.013 | 0.005 |
| 15*[2] | 0.09 | 0.22 | 1.13 | 0.014 | 0.002 | 0.01 | 0.002 | 0.01 | 0.002 | 0.02 | — | — | — | 0.012 | 0.006 |
| 16*[3] | 0.13 | 0.21 | 1.14 | 0.013 | 0.002 | 0.02 | 0.004 | 0.02 | 0.004 | 0.03 | — | — | — | 0.013 | 0.005 |

*[1]Ca: 0.005%, *[2]Mg: 0.04%, *[3]REM: 0.007%

TABLE 3

| Steel No. | Composition (wt %) | | | | | | | | | | | | | | |
|---|---|---|---|---|---|---|---|---|---|---|---|---|---|---|---|
| | C | Si | Mn | P | S | Ni | Cr | Mo | Cu | Ti | Nb | V | B | Al | N |
| 17 | 0.55 | 0.20 | 1.01 | 0.012 | 0.002 | 0.01 | — | — | — | — | — | — | — | 0.012 | 0.006 |
| 18 | 0.18 | 0.22 | 1.02 | 0.012 | 0.004 | — | 6.55 | 0.52 | — | — | 0.56 | — | — | 0.013 | 0.005 |
| 19 | 0.17 | 1.23 | 1.52 | 0.013 | 0.002 | — | — | — | — | — | — | — | — | 0.005 | 0.005 |
| 20 | 0.20 | 0.22 | 2.52 | 0.012 | 0.002 | — | — | — | — | 0.15 | 0.26 | 0.57 | 0.007 | 0.005 | 0.006 |

TABLE 4

| Steel No. | C (%) | Amount of oxygen in molton pool (%) | Voids and inclusions (%) | Evaluation |
|---|---|---|---|---|
| 1 | 0.05 | 0.025 | 0.5 | ○ |
| 2 | 0.08 | 0.025 | 0.7 | ○ |
| 3 | 0.12 | 0.025 | 0.8 | ○ |
| 4 | 0.20 | 0.025 | 1.3 | Δ |
| 5 | 0.25 | 0.025 | 1.4 | Δ |
| 6 | 0.41 | 0.025 | 1.4 | Δ |
| 7 | 0.30 | 0.025 | 1.3 | Δ |
| 8 | 0.31 | 0.025 | 1.3 | Δ |
| 9 | 0.31 | 0.025 | 1.3 | Δ |
| 10 | 0.31 | 0.020 | 1.0 | ○ |
| 10 | 0.31 | 0.025 | 1.4 | Δ |
| 10* | 0.31 | 0.035 | 2.5 | X |
| 11 | 0.02 | 0.020 | 0.4 | ○ |
| 11 | 0.02 | 0.040 | 0.3 | ○ |
| 11 | 0.02 | 0.055 | 0.4 | ○ |
| 12 | 0.08 | 0.020 | 0.6 | ○ |
| 12 | 0.08 | 0.040 | 0.9 | ○ |
| 12 | 0.08 | 0.055 | 1.5 | Δ |
| 13 | 0.03 | 0.035 | 0.5 | ○ |
| 14 | 0.08 | 0.035 | 0.9 | ○ |
| 15 | 0.09 | 0.035 | 0.9 | ○ |
| 16 | 0.13 | 0.025 | 0.9 | ○ |
| 16 | 0.13 | 0.035 | 1.0 | ○ |
| 16* | 0.13 | 0.065 | 2.4 | X |
| 17 | 0.55 | unable to roll | — | — |
| 18 | 0.18 | 0.025 | 2.1 | X |
| 18 | 0.18 | 0.035 | 2.5 | X |
| 18 | 0.18 | 0.055 | 2.6 | X |
| 19 | 0.17 | 0.025 | 2.1 | X |
| 19 | 0.17 | 0.035 | 2.3 | X |
| 19 | 0.17 | 0.055 | 2.3 | X |
| 20 | 0.20 | unable to roll | — | — |

Embodiment 2

The inventors found an efficient manufacturing method of laser-welded steel pipe with less defects in the melted and solidified part by controlling the relation between the carbon amount in the steel and the oxygen amount in the melted and solidified zone entering during pre-heating edge parts facing each other on the open pipe to a specified range.

To prevent the occurrence of CO and $CO_2$ gas forming reactions, either one of C or O should be prevented from entering into the molten pool. Pre-heating can be conducted in a state of almost completely isolating atmospheric air, in terms of technology, though the cost problem is not taken into account. For example, an open pipe can be produced in a vacuum, and laser-welding may be applied in the vacuum. This method needs, however, significantly high investment cost and operating cost.

More realistically, for example, nitrogen gas may be introduced to the peripheral zone of welding part during the pre-heating stage, or pre-heating and laser-welding are carried out while admitting oxidization by atmospheric air during the pre-heating stage. Oxidization in air is affected by heating temperature and heating period. That is, higher heating temperature and longer heating period enhance oxidization and produce an increased amount of oxides, and increase the amount of oxygen brought into the molten pool.

On the other hand, when a small amount of carbon exists in the steel, no reaction to form CO and $CO_2$ occurs, which reaction is described above, even when the amount of oxygen in the molten pool is large. Accordingly, the condition of pre-heating becomes considerably broad in the case that welded steel pipe is produced from a steel containing very little amount of carbon by the process of pre-heating followed by laser-welding. On the other hand, when a steel containing a large amount of carbon is used for producing welded steel pipe, the condition of pre-heating becomes considerably narrow, and the pre-heating period is required to shorten.

Carbon is the most common and a useful alloying element in the iron and steel materials, so the carbon is added to the steel composition at an adequate amount responding to the object and application of the steel. Therefore, if the amount of oxygen in the welding metal is specified corresponding to the steel composition, the specification adds a significant meaning to industrial application of steel.

The inventors completed the embodiment 2 on the basis of the above-described findings. The present invention is a method for manufacturing laser-welded steel pipe, which method comprises the steps of:

preparing an open pipe from a hot-rolled steel strip using a forming roll; pre-heating each of edge parts facing each other on the open pipe; pressing the open pipe by squeeze rolls to butt the edge parts each other; heating to melt the edge parts which were pre-heated and butted using laser irradiation to produce the welded steel pipe; wherein the amount of oxygen in welding metal structuring the welded steel pipe is controlled in relation to the amount of carbon in the melted and solidified metal to a range of (1) [C wt. %]×[O wt. %]≦0.006 wt. % for a carbon steel containing less than 0.20 wt. % C, and (2) [O wt. %]≦0.03 wt. % for a carbon steel containing 0.20 wt. % or more C, and furthermore the controlling range is (1) [C wt. %]×[O wt. %]≦0.004 wt. % for a carbon steel containing less than 0.20 wt. % C, and (2) [O wt. %]≦0.02 wt. % for a carbon steel containing 0.20 wt. % or more C.

Figure 4:
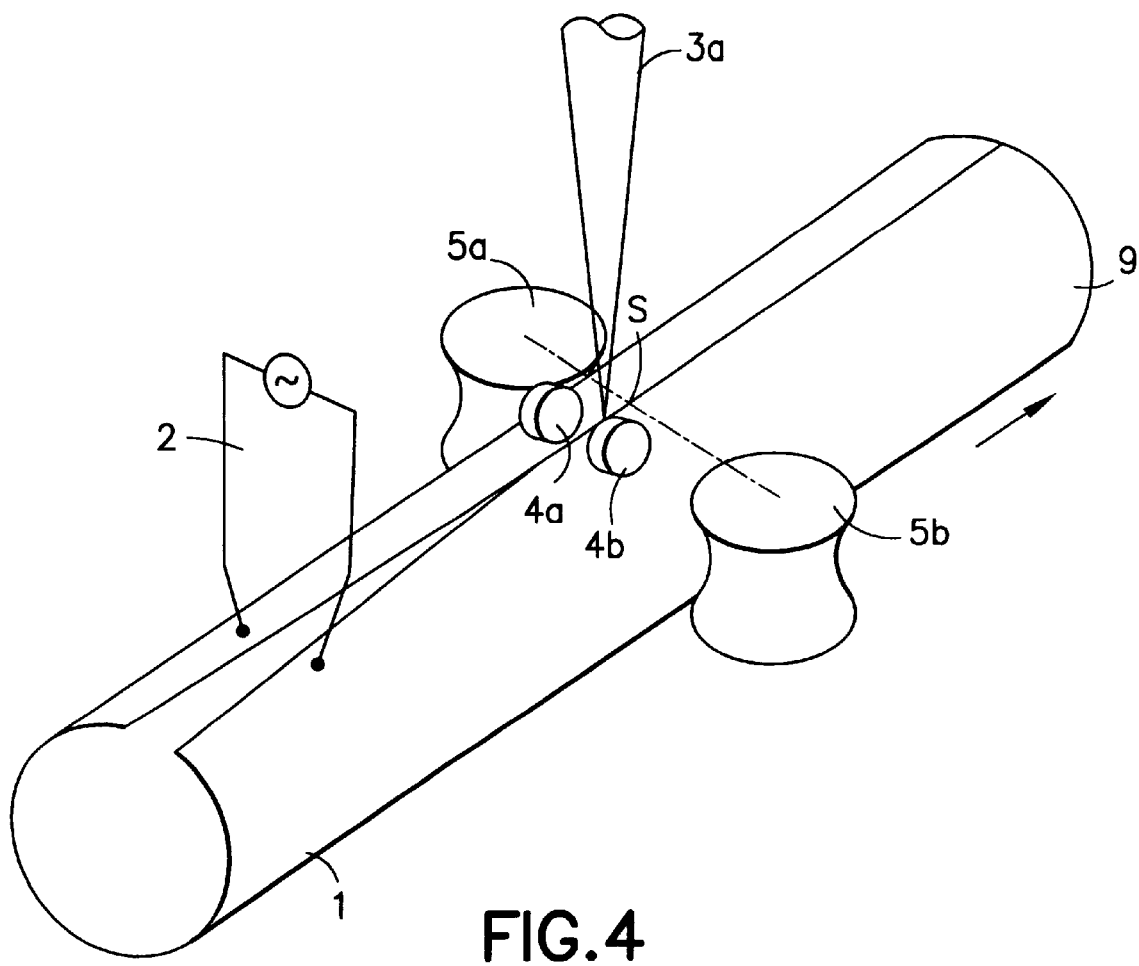
FIG. 4 is a schematic drawing illustrating the manufacturing method of the welded steel pipe of the present invention.

The embodiment 2 relates to a method for manufacturing welded pipe. FIG. 4 shows a schematic drawing of the method of the embodiment 2. The reference numbers given in FIG. 4 indicate: contact tip 2, squeeze roll 5, guide roll 4, laser irradiation beam 3a, steel pipe 9, and open pipe 1. As seen in FIG. 4, the open pipe 1 is moved by the guide rolls 4a and 4b, and the squeeze rolls 5a and 5b to arrow direction. The high frequency induction heating using the contact tip 2 pre-heats the edge parts facing each other on the open pipe 1. The squeeze rolls 5a and 5b butt the edge parts together. The laser irradiation beam 3a fuses the butted portion of the edge parts to weld to form the steel pipe 9.

The C content of the steel for applying the method of the embodiment 2 is preferably 0.50 wt. % or less. When laser-welding is applied to a steel containing C above 0.50 wt. %, the ductility and toughness of the steel wire degraded, and the production of excellent steel pipe becomes difficult.

Through a series of extensive experiments, the inventors found a region of small weld defect rate and a region of further small weld defect rate on a graph of FIG. 3 drawn on C content in steel (horizontal axis) versus O content in welding metal (vertical axis), which region of small defect rate is below the line "A" that is defined by the conditions of C<0.2 wt. % : [C wt. %]×[O wt. %]=0.006, and C≧0.2 wt. % : [O wt. %]=0.03, and which further small defect rate is below the line "B" that is defined by the conditions of C<0.2 wt. %: [C wt. %]×[O wt. %]=0.004, and C≧0.2 wt. %: [O wt. %]=0.02.

In a region above the line "A", the weld defect rate at welded part exceeds 2.0%. In a region between the line "A" and the line "B", the weld defect rate is in a range of from 1.0 to 2.0%. In a region below the line "B", the weld defect rate is 1.0% or less.

The above-described CO and $CO_2$ forming reactions may be affected by the amount of oxidizing elements (such as Al and Si) in the steel. Nevertheless, the inventors confirmed that the oxidizing elements such as Si and Al do not affect the generation of weld defects in the present invention.

EXAMPLE

The embodiment 2 is described in more detail referring to the examples.

Each of the steels No. 1 through No. 10 having the composition shown in Table 5 was prepared by converter-melting and degassing processing, and it was subjected to continuous casting, slab heating, and hot-rolling to obtain hot-rolled steel strip. From thus formed hot-rolled steel strip, an open pipe 1 was continuously produced using multi-stage forming rolls. Both edge parts facing each other on the open pipe 6 were pre-heated to a specified temperature level given in Table 6 and Table 7 applying power through the contact tip 2. The edge parts were press-butted together using the squeeze rolls 5a and 5b to fuse the butted part of edge parts under the laser irradiation. Then upset is given to the open pipe to produce each sample of No. 1 through No. 50 of the welded steel pipe. The holding time of the open pipe at the pre-heating temperature was about 5 sec. The time between the temperature increase from (pre-heating temperature—50° C.) to the pre-heating temperature was about 5 sec.

The laser-welding condition was 800 kW of power input from the contact tip, 10 m/min. of welding speed, and the upset was varied in a range of from 0 to 5 mm. The laser output was 10 kW, the beam diameter at the focusing point was 0.5 mm, and the irradiation was conducted from above the open edge pipe 9 while focusing on the butting point of the edge parts.

All the produced steel pipes 9 had a size of 609.6 mm of outer diameter and 11.1 mm of thickness.

After the pipes were produced, the generation of weld defects on each welded part on the samples No. 1 through No. 50 was inspected. The inspection was conducted by microscopic observation at the weld zone. The observation section was selected to a plane lateral to the weld line (longitudinal direction of pipe). Table 6 and Table 7 show the result of observation. FIG. 3 shows the result in a relation between oxygen amount and carbon amount in the welding metal. In FIG. 3, the mark (x) corresponds to the defect rate of 2% or more, the mark (Δ) corresponds to the defect rate ranging from 1% to 2%, and the mark (○) corresponds to the defect rate of 1% or less. The voids and inclusions were counted while they were not separately treated.

As clearly shown in FIG. 3, when the oxygen amount and the carbon amount are in a region below the line "A" that is defined by the conditions of C<0.2 wt. %: [C wt. %]×[O wt. %]=0.006, and C≧0.2 wt. %:[O wt. %]=0.03 wt. %, the defect rate at welded part is excellent giving 2.0% or less. Furthermore, when the oxygen amount and the carbon amount are in a region below the line "B" that is defined by the conditions of C<0.2 wt. % : [C wt. %]×[O wt. %]=0.004, and C≧0.2 wt. %:[O wt. %]=0.02 wt. %, the defect rate at welded part is further excellent giving 1.0% or less.

Figure 3:
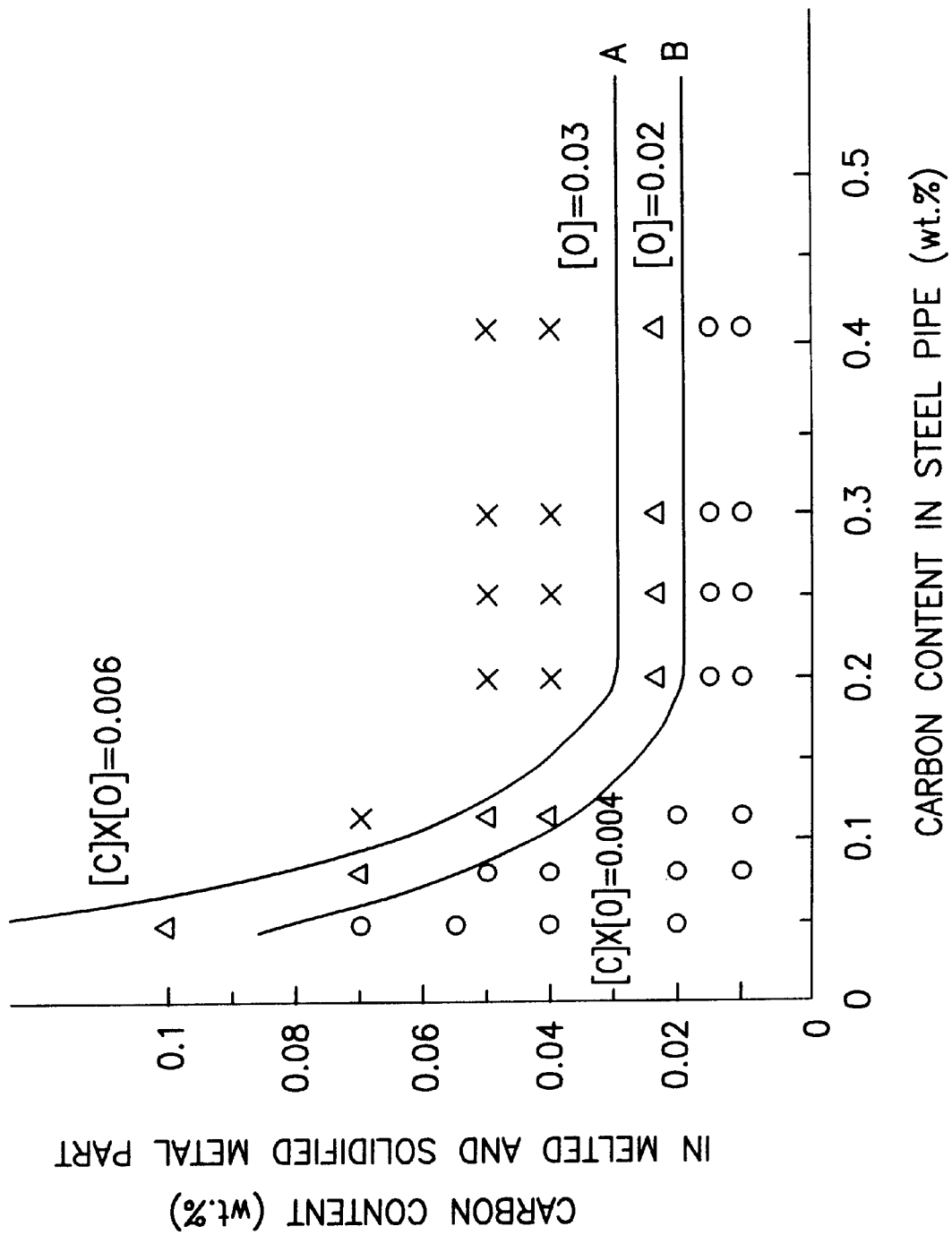
FIG. 3 is a graphical representation showing the relationship between C content and O content in the melted and solidified metal part, and defect rate in weld zone according to the embodiment 2.

From Table 5, Table 6, Table 7, and FIG. 3, the variation of Si content in steel in a range of from 0.1 to 0.5 wt. % and the variation of Al content in steel in a range of from 0.005 to 0.025 wt. % do not affect the generation of weld defects. The non-effective phenomenon is presumably caused by that the increase of these deoxidizing elements ensures sufficient deoxidization to suppress the generation of CO and $CO_2$, though the amount of inclusions increases, thus the generation of weld defects is independent of the presence of these deoxidizing elements as far as they are in a range described above.

TABLE 5

| Steel No. | Composition (wt %) | | | | | | |
|---|---|---|---|---|---|---|---|
| | C | Si | Mn | P | S | Al | N |
| 1 | 0.05 | 0.22 | 1.15 | 0.012 | 0.0025 | 0.005 | — |
| 2 | 0.08 | 0.24 | 1.15 | 0.012 | 0.0025 | 0.005 | 0.003 |
| 3 | 0.12 | 0.23 | 1.22 | 0.013 | 0.0023 | 0.005 | 0.002 |
| 4 | 0.20 | 0.25 | 1.16 | 0.012 | 0.0025 | 0.005 | 0.003 |
| 5 | 0.25 | 0.25 | 1.22 | 0.014 | 0.0024 | 0.008 | 0.002 |
| 6 | 0.41 | 0.22 | 1.15 | 0.012 | 0.0023 | 0.005 | 0.003 |
| 7 | 0.30 | 0.12 | 1.15 | 0.012 | 0.0024 | 0.005 | 0.002 |
| 8 | 0.31 | 0.42 | 1.15 | 0.012 | 0.0025 | 0.006 | 0.003 |
| 9 | 0.31 | 0.22 | 1.15 | 0.012 | 0.0023 | 0.014 | 0.002 |
| 10 | 0.31 | 0.22 | 1.15 | 0.012 | 0.0023 | 0.023 | 0.004 |

TABLE 6

| Sample No. | Steel No. | Oxygen content in welding metal (wt %) | Defect rate at welded part (wt %) |
|---|---|---|---|
| 1 | 1 | 0.02 | 0.5 |
| 2 | 1 | 0.04 | 0.6 |
| 3 | 1 | 0.055 | 0.6 |
| 4 | 1 | 0.07 | 0.6 |
| 5 | 1 | 0.10 | 0.7 |
| 6 | 2 | 0.01 | 0.5 |
| 7 | 2 | 0.02 | 0.6 |
| 8 | 2 | 0.04 | 0.7 |
| 9 | 2 | 0.05 | 0.8 |
| 10 | 2 | 0.07 | 1.2 |
| 11 | 3 | 0.01 | 0.5 |
| 12 | 3 | 0.02 | 1.2 |
| 13 | 3 | 0.04 | 1.5 |
| 14 | 3 | 0.05 | 1.2 |
| 15 | 3 | 0.07 | 3.5 |
| 16 | 4 | 0.01 | 0.6 |
| 17 | 4 | 0.015 | 0.8 |
| 18 | 4 | 0.025 | 1.1 |
| 19 | 4 | 0.04 | 2.5 |
| 20 | 4 | 0.05 | 3.6 |
| 21 | 5 | 0.01 | 0.8 |
| 22 | 5 | 0.015 | 0.9 |

TABLE 6-continued

| Sample No. | Steel No. | Oxygen content in welding metal (wt %) | Defect rate at welded part (wt %) |
|---|---|---|---|
| 23 | 5 | 0.025 | 1.5 |
| 24 | 5 | 0.04 | 2.5 |
| 25 | 5 | 0.05 | 3.5 |
| 26 | 6 | 0.01 | 0.9 |
| 27 | 6 | 0.015 | 1.3 |
| 28 | 6 | 0.025 | 2.1 |
| 29 | 6 | 0.04 | 3.9 |
| 30 | 6 | 0.05 | 5.2 |

TABLE 7

| Sample No. | Steel No. | Oxygen content in welding metal (wt %) | Defect rate at welded part (wt %) |
|---|---|---|---|
| 31 | 7 | 0.01 | 0.8 |
| 32 | 7 | 0.015 | 1.2 |
| 33 | 7 | 0.025 | 1.7 |
| 34 | 7 | 0.04 | 2.9 |
| 35 | 7 | 0.05 | 4.1 |
| 36 | 8 | 0.01 | 0.8 |
| 37 | 8 | 0.015 | 1.1 |
| 38 | 8 | 0.025 | 1.7 |
| 39 | 8 | 0.04 | 3.2 |
| 40 | 8 | 0.05 | 4.5 |
| 41 | 9 | 0.01 | 0.8 |
| 42 | 9 | 0.015 | 1.2 |
| 43 | 9 | 0.025 | 1.7 |
| 44 | 9 | 0.04 | 2.8 |
| 45 | 9 | 0.05 | 4.4 |
| 46 | 10 | 0.01 | 0.8 |
| 47 | 10 | 0.015 | 1.1 |
| 48 | 10 | 0.025 | 1.8 |
| 49 | 10 | 0.04 | 3.1 |
| 50 | 10 | 0.05 | 4.4 |

What is claimed is:

1. A laser-welded steel pipe having a weld zone comprising:

a steel pipe consisting essentially of (i) C in an amount of 0.25 to 0.5 wt. %, (ii) Si, said Si being in an amount of 1 wt. % or less, (iii) Mn in an amount of 0.05 to 2 wt. % and (iv) Cr in an amount of 6 wt. % or less;

said weld zone having a melted and solidified metal structure; and said melted and solidified metal structure containing carbon and oxygen, the oxygen content in the melted and solidified metal structure being at most 0.03 wt. %.

2. The laser-welded steel pipe of claim 1, wherein the oxygen content in the melted and solidified metal structure is at most 0.02 wt. %.

3. The laser-welded steel pipe of claim 1, wherein the oxygen content in the melted and solidified metal structure is from 0.01 to 0.02 wt. %.

4. The laser-welded steel pipe of claim 1, wherein the C is in an amount of 0.25 wt. %.

5. The laser-welded steel pipe of claim 4, wherein the Si is in an amount of 0.25 wt. % and the Mn is in an amount of 1.22 wt. %.

6. The laser-welded steel pipe of claim 1, wherein the C is in an amount of 0.30 wt. %.

7. The laser-welded steel pipe of claim 6, wherein the Si is in an amount of 0.12 wt. % and the Mn is in an amount of 1.15 wt. %.

8. The laser-welded steel pipe of claim 1, wherein the C is in an amount of 0.31 wt. %.

9. The laser-welded steel pipe of claim 8, wherein the Si is in an amount of 0.22 wt. %, 0.25 wt. % or 0.42 wt. % and the Mn is in an amount of 1.15 wt. %.

10. The laser-welded steel pipe of claim 8, wherein the Si is in an amount of 0.25 wt. % and the Mn is in an amount of 0.15 wt. %.

11. The laser-welded steel pipe of claim 8, wherein the Si is in an amount of 0.42 wt. % and the Mn is in an amount of 1.15 wt. %.

12. The laser-welded steel pipe of claim 1, wherein the C is in an amount of 0.41 wt. %.

13. The laser-welded steel pipe of claim 12, wherein the Si is in an amount of 0.22 wt. % and the Mn is in an amount of 1.15 wt. %.

* * * * *